United States Patent

Dahl et al.

[11] Patent Number: 5,300,533
[45] Date of Patent: Apr. 5, 1994

[54] METHOD FOR PRODUCTION OF CROSSLINKED PLASTIC FOAM

[75] Inventors: Roger Dahl, Stenungsund, Sweden; Steinar Pedersen, Skien; Raymond Boreng, Stavanger, both of Norway

[73] Assignee: Norsk Hydro a.s., Oslo, Norway

[21] Appl. No.: 859,719

[22] PCT Filed: Nov. 29, 1990

[86] PCT No.: PCT/NO90/00177
  § 371 Date: Jun. 8, 1992
  § 102(e) Date: Jun. 8, 1992

[87] PCT Pub. No.: WO91/09076
  PCT Pub. Date: Jun. 27, 1991

[30] Foreign Application Priority Data
  Dec. 8, 1989 [NO] Norway .................. 894955

[51] Int. Cl.$^5$ .............. C08J 9/10; C08J 9/30
[52] U.S. Cl. .................. 521/76; 521/73; 521/95; 521/145; 521/149; 521/178
[58] Field of Search ............ 521/178, 95, 96, 145, 521/149, 73

[56] References Cited

PUBLICATIONS

Toray, Abstract for JP 71005221 (1971).
Ishida, Abstract for JP 71005220 (1971).
Otsuka, Abstract for JP 58021433 (1983).
Mitsubishi Electric, Abstract for JP 77010151 (1977).
Furukawa, Abstract for EP 0053190 (1982).
Mitsubishi Monsanto, Abstract for GB 1490912 (1977).

*Primary Examiner*—Morton Foelak
*Attorney, Agent, or Firm*—Wenderoth, Lind & Ponack

[57] ABSTRACT

A method for production of a crosslinked, foamed vinyl chloride containing polymer, by adding a blowing agent to a copolymer produced by a copolymerisation of a monomer composition comprising vinyl chloride and glycidyl containing monomer, and optionally other monomers, foaming the copolymer, where the decomposition products of the blowing agent or decomposition products of reaction produces from the blowing agent, are chemically reactive with epoxy groups of the copolymer or its reaction products, and crosslinking the copolymer when the blowing agent or the reaction product of the blowing agent is decomposed.

13 Claims, No Drawings

METHOD FOR PRODUCTION OF CROSSLINKED PLASTIC FOAM

The present invention concerns a new method for production of crosslinked foamed plastics, based on a copolymer where the monomer composition mainly consists of vinyl chloride.

A relatively great part of the PVC comsumption is used for foamed products. To obtain a foamed product, a blowing agent is added to the composition. At high temperatures the blowing agent is decomposed giving gas as one of the products, which results in foaming of the product. The foaming can be carried out during the processing, for example gelling of paste or free foaming after extrusion.

The process also could be carried out in several stages. First the material can be processed below the decomposition temperature for the blowing agent, and then be decomposed in a separate stage. This often is done under pressure in an autoclave in such a way that the material is not foamed. After cooling the pressure can be reduced without occurrence of foaming.

The high viscosity of the material at low temperatures is the cause of this. The foaming can be regulated by heating the blowing agent to a suitable temperature where the wanted properties are obtained, for example density and cell structure.

Foamed products are interesting because of their low density. Based on volume this gives a cheaper product, because the material demanded simultaneously decreases. Rigid, foamed PVC products often are used for "sandwich" constructions in automobile-, boat- and air industry. Soft products can be used as acoustic insulation, vibration damper, insulation, sealings etc. Both rigid and soft products are used in buoyancy bodies.

If the mechanical stability for the PVC foam is improved, especially at high temperatures, the range of application will increase. This can be obtained by crosslinking the foamed product. Many methods are avaiable for crosslinking of foam, for example radiation, use of peroxide which results in the formation of free radicals, the addition of low molecular substances which can be crosslinked etc. Crosslinking during radiation is an expensive process which often results in disintegration of PVC during processing. The resulting product often will be a brittle material.

A method much in use for production of crosslinked PVC foam, is a process developed by the French company Kleber Colombes (French patent No. 1 366 979). By this method isocyanate is added both as plasticiser and crosslinking agent. The method gives a network which reinforces the PVC foam, but PVC is not a part of this network. There are several drawbacks with this system, but first of all it concerns the handling of isocyanate, which demands great care. In addition the resulting product can be brittle and can have a reduced resistance to solvents.

The object of the invention is to develop a new method for production of crosslinked polymer foam with good mechanical stability. It is essential to obtain a method which is environmental friendly, simple and cheap. It is an object to avoid extra process steps as crosslinking, for example by radiation.

These and other objects of the invention are obtained by the method as described below and the invention is characterized and defined by the accompanying patent claims.

By this invention one has found a new method for production of crosslinked vinyl chloride containing foam. It is simple, cheap, environmental friendly and does not demand irridation or extra addition of chemicals (compared to production of non-crosslinked foam). The method is based on, the surprising discovery that the decomposition products from the blowing agent which is added to the polymer, can be used as crosslinking agent, provided that the polymer contains a glycidyl compound. Therefore a copolymer is produced where vinyl chloride and a glycidyl (epoxy) containing monomer or eventually another monomer is used in the polymerisation. A blowing agent is added to the polymer where the decomposition products from the blowing agent or the decomposition products of the reaction products from the blowing agent are chemically reactive with the epoxy-groups or their reaction products. Crosslinking takes place when the blowing agent or the reaction products of the blowing agent are decomposed. The polymer compound could first be foamed by being exposed to temperatures above the the decomposition temperature of the blowing agent in a short time interval, for thereafter to be crosslinked by heat treatment above the decomposition temperature for the blowing agent for a lomger period. It is also possible to perform both foaming and crosslinking in one process step.

Preferably there is used a monomer mixture with 30-99.95% vinyl chloride, especially 70-99.95%. The glycidyl containing monomer preferably is an acrylate, methacrylate or butylacrylate composition added in an amount of 0.05-30%, preferably 0.2-5%. Blowing agents with, for example ammonia, cyanic acid or isocyanic acid as decomposition products can be used. It was found that the crosslinking could be controlled by the use of certain blowing agents. A preferred blowing agent is unmodified or modified azodicarbonamide. The method is applicable for copolymers produced with each of suspension-, microsuspension-, emulsion- or mass polymerisation. Other features of the invention are described more in detail below.

A blowing agent which can be used for a variety of purposes, for example together with PVC, is azodicarbonamide in pure or modified form. This is a product which decomposes at about 60°-215° C., dependent on the environment. Azodicarbonamide can be decomposed in different ways:

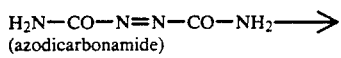 I
(azodicarbonamide)

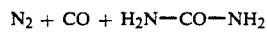

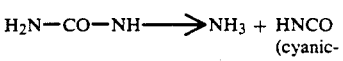 II
(cyanic- or isocyanic acid)

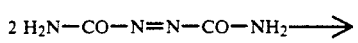 III

 IV

-continued

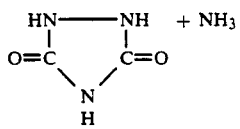

Cyanic acid can be trimerizised to cyanuric acid similarly as isocyanuric acid can be formed from isocyanic acid.

In addition to azodicarbonamide there are several blowing agents which liberate ammonia, for example trihydrazinotriazine and p-toluene sulphonyl semicarbazide.

Regardless of the decomposition route for the azodicarbonamide, reactive decomposition products such as ammonia and/or isocyanic acid and urea are formed. From experience one knows that these products do not give crosslinking of PVC.

By this invention it has surprisingly been found that a polymer where epoxy groups have been incoporated (grafted) through copolymerisation, can react with decomposition products such as, for example urea, ammonia and isocyanic acid from a blowing agent, and form crosslinking.

The epoxy groups are introduced by copolymerisation of a glycidyl containing monomer, for example glycidyl methacrylate (GMA), vinyl chloride (VCM) and eventually other monomers. Of the total monomer content there shall be 0.05-30 weight % glycidyl containing monomer, preferably 0.2-5 weight %. This is a practical limit because below 0.05% the effect will be too low and above 30% the product will be too expensive. The amount of VCM should make at least 30% of the monomer content. The polymerisation can be performed by suspension-, microsuspension-, emulsion- or mass polymerisation.

By copolymerisation of VCM and GMA, especially by suspension polymerisation at high temperatures, it has turned out to be favourable to add GMA after about 30 min. polymerisation. This is done to obtain a stable suspension. By copolymerisation of VCM and GMA, GMA will be consumed relatively faster than VCM (shown by the reactivity/ratios). Because it is favourable to have such a uniform distribution of GMA in the polymer as possible, this is preferably added in intervals during polymerisation. As GMA is rapidly consumed, it will not be enriched in the monomer phase, something obviously being an advantage if one wants to use a PVC production plant.

There are several possible reactions between the epoxy containing polymer and the decomposition products from the blowing agent. One probable reaction is that ammonia reacts with two or three epoxy groups and results in crosslinking. Other possible reactions are where isocyanic acid or isocyanuric acid is involved. These can react with epoxy or with hydroxyl groups. The reaction patterns however will be similar to the reaction between epoxy and ammonia. The reaction between hydroxyl and isocyanate is catalyzed by tertiary amines. These are the reaction products if ammonia reacts with three epoxy groups. It can not be excluded that urea takes part in the reaction either.

The following examples will illustrate the invention:

EXAMPLE 1

Three different polymer formulations were produced. These are shown in table 1.

TABLE 1

| Recipe | HP1 | CP1 | CP2 |
|---|---|---|---|
| Copolymer (1% GMA + VCM) | — | 100 | 100 |
| Homopolymer (VCM) = PVC | 100 | — | — |
| DOP | 60 | 60 | 60 |
| Interstab LF 3655[1] | 4 | 4 | 4 |
| Genitron AC-2[2] | 2.5 | 2.5 | 2.5 |
| Genitron SCE[3] | — | — | 2.5 |
| Paraloid K125[4] | 5 | 5 | 5 |

[1]commercial leadstab. (Akzo Chemicals)
[2]azodicarbonamide (Schering Industrial Chemicals)
[3]modified azodicarbonamide (Schering Industrial Chemical)
[4]processing aid (Rohm and Haas Company)

The compounds were roll-milled for 3 minutes at about 150° C. Blowing on the roll-mill id not occur. Ribbons of the roll-milled sheet were placed in a Werner-Mathis oven at 185° C. for 5 or 10 minutes respectively.

The following analysis were performed:

Gel content: (=gel) Qualitative (continuous gel or not) or quantitative gel content (i.e. part of gel in solvent being insoluble in PVC) was measured in tetrahydrofuran (THF) at room temperature.

Deformation: Deformation as a function of temperature was measured on a Mettler TMA. An indentor with a cross sectional area of 7 mm$^2$ was loaded to the sample with a force of 0.02N. The start temperature was 35° C. and the heating rate was 10 C/min. The final temperature in the chamber was 210° C., which gave the sample a final temperature of 200° C. The results given in table 3 are deformation at final temperature.

Calorimetry (DSC): The decomposition progress is measured with differential scancalorimetry (DSC). The start temperature was 35° C. and the heating rate was 10 C/min.

The results of the tests are shown in the following tables.

TABLE 2

| Recipe | Blowing temp. (Peak), (°C.) | Starting temperature before blowing (°C.) |
|---|---|---|
| HP1 | 175 | 160 |
| CP1 | 180 | 160 |
| CP2 | 173 | 150 |

Table 2 shows that there is no significant difference between the blowing temperature for the copolymer (VCM:GMA) and PVC homopolymer.

TABLE 3

| Recipe | *Time in oven (min) | Gel in THF | Deformation (%) |
|---|---|---|---|
| HP1 | 5 | No | 26 |
| " | 10 | No | 36 |
| CP1 | 5 | No | 28 |
| " | 10 | Yes | 27 |
| CP2 | 5 | Yes | 11 |
| " | 10 | Yes (79%) | 7 |

*W. Mathis oven at 185° C.

The results for HP1 confirm earlier experience which indicates that PVC homopolymers will not be crosslinked by the decomposition products.

The fact that CP1 is not crosslinked after 5 minutes although it is foamed, can indicate that the decomposition follows chemical equation (I) and (II), i.e. in the first step the non-reactive decomposition products are formed and in the next step reactive products are formed. The importance of this is that foam can be formed before the crosslinking takes place. This is favourable as a crosslinking increases the viscosity and normally also makes the foaming process more difficult.

CP2 was crosslinked faster than CP1 which is due to the fact that azodicarbonamide is modified in this case leading to quicker decomposition, which also should mean that the reactive decomposition products are liberated faster.

The much improved deformation results for CP2 is very logical, when an improvement of the deformation properties is to be expected when crosslinking is introduced. This is one of the most important improvement of properties obtained by crosslinking.

EXAMPLE 2

Extrusion was carried out on a twin screw extruder, where the recipe was based on PVC and copolymer (VCM:GMA 99:1), see table 4. The experiment was carried out with two temperature profiles, compare table 5. After extrusion a part of the samples was placed in a W. Mathis oven where the temperature was 185° C.

TABLE 4

| Recipe | EH1 | EC1 |
|---|---|---|
| PVC-Homopolymer | 100 | — |
| Copolymer (VCM:GMA 99:1) | — | 100 |
| DOP | 50 | 50 |
| Interstab LF 3655 | 4 | 4 |
| Paraloid K-125 | 5 | 5 |
| Genitron SCE | 2.5 | 2.5 |

TABLE 5

| Sample | Temp. Extruder (°C.) | | | | Time in W. Mathis at 185° C. (min.) | Gel in THF | Density (kg/m³) |
|---|---|---|---|---|---|---|---|
| EH1 | 130 | 140 | 155 | 200 | 0 | no | 500 |
|  | 130 | 140 | 155 | 200 | 5 | no | " |
|  | 130 | 140 | 195 | 206 | 0 | no | 650 |
| EC1 | | | | | | | |
| no 1. | 130 | 140 | 155 | 170 | 0 | no | 1200 |
| no 2. | 130 | 140 | 155 | 170 | 5 | yes | 500 |
| no 3. | 130 | 140 | 155 | 200 | 0 | no | 500 |
| no 4. | 130 | 140 | 155 | 200 | 5 | yes | " |
| no 5. | 130 | 140 | 195 | 206 | 0 | yes | 650 |

Table 5 shows, as expected, that the use of PVC homopolymer does not give crosslinking. The table also shows that when the copolymer is used, one can choose method to obtain crosslinking. For EC1 it is shown that when the temperature is kept below the decomposition temperature of the blowing agent, blowing (foaming) and crosslinking can be carried out in a separate step after the extrusion, see number 1 and 2. If the temperature in the extruder is chosen to be kept above the the decomposition temperature of the blowing agent for a short time interval, foaming can be carried out, but not crosslinking, see number 3 and 4. By keeping the temperature high over a long section of the extruder, the time interval is increased and both crosslinking and foaming during extrusion is obtained, see number 5.

Having these possibilities, it should not be difficult to adapt this process to multi-stage processes where decomposition is carried out under pressure. Dependent on how long a time the material is kept above the decomposition temperature of the blowing agent, one can choose crosslinking before or after foaming. In special cases where a high degree of foaming is wanted, it can be preferable to modify the melt strength to an optimum level by introducing a certain degree of crosslinking before foaming.

In the above examples, soft products are used. In principle there is no difference in crosslinking rigid or medium flexible, products according to this method. If no foaming during processing is wanted, however, the selection of kickers (activator) will be reduced, because the temperature during processing will be higher. By use of vinyl chloride containing polymers, the choice of thermostabilizer will be more critical. If calcium/zinc based or tin based stabilizers are used, the material can be processed without having foaming on the roller or extruder. Crosslinking in connection with foaming is easiest obtained if modified azodicarbonamide is used (gives foaming at lower temperatures).

EXAMPLE 3

The materials in table 6 were roll-milled for three minutes at about 165° C. This gives a mass temperature of about 175° C. The materials were foamed in an oven at 185° C. Tables shows if the crosslinking has taken place after foaming.

TABLE 6

| Recipe | CP3 | CP4 | CP5 | CP6 | CP7 |
|---|---|---|---|---|---|
| COPOLYMER (VCM:GMA 99:1) | 100 | 100 | 100 | 100 | 100 |
| Genitron AC-2 | 2.5 | 2.5 | 2.5 | — | — |
| Paraloid K125 | 5 | 5 | 5 | 5 | 5 |
| Genitron SCE | — | — | — | 2.5 | 5 |
| Butylbenzyl phtalate[5] | 10 | 10 | — | 10 | — |
| Irgastab CZ-130[6] | 2 | 2 | 2 | 2 | 2 |
| Edenol D-81[7] | 2 | — | 2 | — | 2 |

[5]Plasticiser
[6]Commercial Calcium/Zinc stabilizer (Ciba-Geigy)
[7]Epoxidated soyaoil

TABLE 7

| SAMPLE | TIME IN OVEN AT 185° C. | GEL IN THF |
|---|---|---|
| CP3 | 5 min. | NO |
|  | 10 min. | NO |
| CP4 | 5 min. | NO |
|  | 10 min. | NO |
| CP5 | 5 min. | NO |
|  | 10 min. | NO |
| CP6 | 2 min. | YES |
|  | 5 min. | YES |
|  | 10 min. | YES |
| CP7 | 2 min. | YES |
|  | 5 min. | YES |
|  | 10 min. | YES |

Tables 6 and 7 show that in certain formulations it is necessary to use a modified azodicarbonamide, for example Genitron SCE, to obtain crosslinking.

EXAMPLE 4

By using the method for plastisols the following formulations are used, refer to the recipe in table 8.

TABLE 8

| Recipe | PC1 | PC2 | PH1 |
|---|---|---|---|
| Emulsion polymer (PVC) | — | — | 100 |
| Emulsions polymer (VCM:GMA 99:1) | 100 | — | — |
| Emulsions polymer | — | 100 | — |

TABLE 8-continued

| Recipe | PC1 | PC2 | PH1 |
|---|---|---|---|
| (VCM:GMA 98:1) | | | |
| DOP | 50 | 50 | 50 |
| Dyphos[8] | 3 | 3 | 3 |
| Genitron AC-SP4[9] | 2.5 | 2.5 | 2.5 |

[8]Dibasic leadphosphite (Thermostabilizer)
[9]Azodicarbonamide in finely divided dispersion.

These formulations are mixed and the paste is coated onto a release paper. The plastisol is gelled and foamed at 190° C. Table 9 shows whether crosslinking has taken place after foaming or not.

TABLE 9

| SAMPLE | TIME IN OVEN AT 185° C. | GEL IN THF |
|---|---|---|
| PC1 | 5 min. | YES |
|  | 10 min. | YES |
| PC2 | 5 min. | YES |
|  | 10 min. | YES |
| PH1 | 5 min. | NO |
|  | 10 min. | NO |

Table 9 shows that the use of PVC homopolymer does not give crosslinked foam, but that the copolymer (VCM:GMA) gives crosslinking in connection with foaming of the plastisol when azodicarbonamide is used as foaming agent. It is thereby shown that the method also can be used for plastisols.

By this invention a method has been developed which makes it possible to crosslink foamed vinyl chloride polymers through an addition of epoxy groups which are introduced via a copolymer. The crosslinking takes place by help of the decomposition products from the blowing agent. The use of other chemical compositions than those used for foaming is not necessary.

As long as the processing temperature is lower than the decomposition temperature there is no risk for unwanted crosslinking to take place, for example during extrusion or rolling. By the use of certain blowing agents the crosslinking can be controlled in such a way that the crosslinking starts after the foaming has started. By use of polymers containing mainly vinyl chloride, the process works by processing of flexible, semiflexible and rigid suspension polymers. The process also functions for processing of plastisols. Besides, it is not very sensitive to changes in the stabilizer systems.

We claim:

1. A method for production of a crosslinked, foamed vinyl chloride containing polymer, which comprises adding a blowing agent to a copolymer produced by a copolymerisation of a monomer composition comprising vinyl chloride and glycidyl containing monomer, foaming the copolymer, where the decomposition products of the blowing agent or decomposition products of reaction products from the blowing agent, are chemically reactive with epoxy groups of the copolymer or its reaction products, an crosslinking the copolymer when the blowing agent or the reaction product of the blowing agent is decomposed.

2. A method according to claim 1, wherein the monomers producing the copolymer further comprise other monomers than the vinyl chloride and the glycidyl containing monomer.

3. A method according to claim 1, wherein first the copolymer is foamed by being exposed to temperatures above the decomposition temperature of the blowing agent in a relatively short time interval, and thereafter is crosslinked by heat treatment above the decomposition temperature of the blowing agent for a longer time period.

4. A method according to claim 1, wherein foaming and crosslinking are performed in one process step.

5. A method according to claim 1, wherein the glycidyl containing monomer is a glycidyl acrylate or methacrylate or butylacrylate.

6. A method according to claim 5, wherein the glycidyl containing monomer contains 0.05–30% glycidyl groups.

7. A method according to claim 1, wherein the monomer composition contains 30–99.95% vinyl chloride.

8. A method according to claim 1, wherein the copolymer is a copolymer of vinyl chloride and glycidyl methacrylate produced by suspension-, microsuspension-, emulsion- or mass polymerisation.

9. A method according to claim 7, wherein the monomer composition contains 70–99.95% vinyl chloride and 0.05–30% glycidyl methacrylate, based on the monomer composition.

10. A method according to claim 9, wherein the monomer composition contains 0.05–30% glycidyl methacrylate.

11. A method according to claim 1, wherein the blowing agent produces ammonia or cyanic acid and/or isocyanic acid as decomposition products.

12. A method according to claim 1, wherein the blowing agent is azodicarbonamide, unmodified or modified.

13. A method according to claim 12, wherein the blowing agent is azodicarbonamide which is surface treated with zinc oxide.

* * * * *